(12) United States Patent
Jonte

(10) Patent No.: US 7,325,747 B2
(45) Date of Patent: Feb. 5, 2008

(54) FLOW COMPENSATED CONTROL VALVE

(75) Inventor: Patrick Jonte, Zionsville, IN (US)

(73) Assignee: Masco Corporation of Indiana, Indianapolis, IN (US)

( * ) Notice: Subject to any disclaimer, the term of this patent is extended or adjusted under 35 U.S.C. 154(b) by 598 days.

(21) Appl. No.: 10/848,195

(22) Filed: May 18, 2004

(65) Prior Publication Data

US 2005/0258258 A1 Nov. 24, 2005

(51) Int. Cl.
  *G05D 23/13* (2006.01)
  *B05B 1/08* (2006.01)
  *F16K 11/074* (2006.01)
(52) U.S. Cl. .............. 236/12.15; 236/12.12; 137/625.48
(58) Field of Classification Search .......... 236/12.15, 236/12.12, 12.22; 137/98, 99, 100, 315.04, 137/315.05, 625.42, 625.48; 4/676, 677
See application file for complete search history.

(56) References Cited

U.S. PATENT DOCUMENTS

| | | | |
|---|---|---|---|
| 4,006,634 A * | 2/1977 | Billette et al. ........... 73/861.53 |
| 4,711,392 A * | 12/1987 | Kidouchi et al. ........ 236/12.12 |
| 5,067,513 A | 11/1991 | Nicklas et al. | |
| 5,340,018 A | 8/1994 | MacDonald | |
| 5,350,112 A | 9/1994 | Stein | |
| 5,355,906 A | 10/1994 | Marty et al. | |
| 5,356,074 A * | 10/1994 | Limet et al. ............. 236/12.22 |
| 5,505,225 A | 4/1996 | Niakan | |
| 6,050,285 A | 4/2000 | Goncze et al. | |
| 6,325,089 B1 | 12/2001 | Breda | |
| 6,676,024 B1 * | 1/2004 | McNerney et al. ...... 236/12.12 |

* cited by examiner

*Primary Examiner*—Chen Wen Jiang
(74) *Attorney, Agent, or Firm*—Woodard, Emhardt, Moriarty, McNett & Henry LLP

(57) ABSTRACT

A fluid control system includes a valve and a restrictor. The valve is configured to regulate the proportion at which a first fluid and a second fluid are mixed together. Based on the pressure drop across the restrictor, the valve further regulates the overall flow rate of the mixed first and second fluids. In one form, the valve includes a pair of spools that regulate the proportion and flow rate of the fluids. In another form, the valve includes a thermostatic element that regulate the proportion at which the first and second fluids are mixed together so as to control the temperature of the mixed fluids. The valve in a further form incorporates a pair of diaphragm valves.

38 Claims, 5 Drawing Sheets

FLOW COMPENSATED CONTROL VALVE

BACKGROUND

The present invention generally concerns flow control valves, and more specifically, but not exclusively, concerns a flow control valve that is able to regulate fluid flow and temperature during both low and high flow conditions.

Comfort and safety are always a concern when designing water control systems for showers or baths. One typical problem that arises during showering (or taking a bath) is the shower's inability to maintain a constant temperature due to variations in supply pressure or in coming water temperature. Many have experienced the unpleasant effects of momentarily being sprayed by frigid water in a shower due to the operation of a dishwasher or washing machine. Even worse, serious burns and other injuries can result when the supply of cold is reduced during the shower, such as when a toilet is flushed or a lawn sprinkler system is activated. It is therefore desirable to maintain a proper flow balance between the hot and cold water in the shower, or even in the bath, so as to prevent scalding or cold water shock.

Maintaining a consistent flow rate from showerheads is also a concern. Under current energy regulations, it has been mandated that home showerheads are limited to a maximum flow rate of 2.5 gallons per minute. Recently, it has become popular for showers to incorporate multiple spray heads or showerheads so that the individual can be sprayed from multiple directions, thereby providing a more pleasant overall shower experience. To further enhance the experience, individual sprays can be turned on and off, either automatically or manually, to create a varying spray pattern. High water flow demand conditions can occur when the water is sprayed from multiple showerheads at the same time and/or when water flows from the bathtub spout, which can tax the control valve supplying water to the showerheads. If the water flow during high demand conditions is insufficient to supply water to all of the showerheads, the water can trickle from the showerheads, which is unsatisfactory in most circumstances. In contrast if the shower/bath valve is sized correctly to provide sufficient flow for these high demand situations then during low demand situations, such as a single showerhead, the valve is effectively "oversized" and precise flow or temperature control is difficult or impossible. In addition, when low demand water flow conditions occur, the spray of water from the showerhead can become unpleasantly hard due to high backpressure. Further complicating matters, flow conditions can rapidly fluctuate when the shower changes between a single showerhead spray mode to a multiple showerhead spray mode. If not properly regulated when switching between modes, the water can flow from the showerheads at an undesirable rate and/or the water temperature can fluctuate. For instance, switching from a single spray mode to a multiple spray mode can result in the water merely trickling showerheads, instead providing an invigorating spray. In a typical multiple-head shower installations, the water for all of the showerheads (and bathtub spout, if so equipped) is fed through a single control valve assembly that regulates the flow of water to the shower or tub. However, conventional valves are usually unable to accurately and automatically control the desired water flow rate and water temperature under both low and high flow demand conditions. Therefore, there is a need for improvement in this field.

SUMMARY OF THE INVENTION

One aspect of the present invention concerns a fluid control valve system. The system includes a flow sensor configured to sense flow of a mixed fluid that includes at least a first fluid and a second fluid. The system further includes a valve. The valve includes a flow regulator operatively coupled to the flow sensor to regulate the flow of the mixed fluid based on the flow of the mixed fluid sensed by the flow sensor. The flow regulator defines at least in part a first flow opening through which the first fluid flows. The flow regulator is configured to shrink the first flow opening to reduce flow of the first fluid upon a decrease in the flow of the mixed fluid at the flow sensor and to enlarge the first flow opening to increase flow of the first fluid upon an increase in the flow of the mixed fluid at the flow sensor. A mixture regulator defines at least in part the first flow opening, and the mixture regulator is configured to regulate a mixture ratio of the first fluid and the second fluid in the mixed fluid by at least adjusting size of the first flow opening.

A further aspect concerns a fluid control valve system. The system includes a housing that defines a cavity and a fluid control element assembly disposed in the cavity. The fluid control element assembly includes a first fluid control element along with the housing defines a first flow opening for controlling flow of a first fluid. A second fluid control element along with the housing defines a second flow opening for controlling flow of a second fluid. The first fluid control element and the second fluid control element define a mixed fluid cavity configured to receive a mixture of the first fluid and the second fluid to regulate flow of the mixture. A bias means is disposed between the first fluid control element and the second fluid control element to bias the first fluid control element from the second fluid control element. The second fluid control element and the housing define a first fluid sensing cavity that is fluidly coupled downstream from the first fluid opening to receive the first fluid. The first fluid control element is configured to enlarge the first flow opening upon an increase in flow of the first fluid and to shrink the first flow opening upon a decrease in flow of the first fluid. The first fluid control element and the housing define a second fluid sensing cavity that is fluidly coupled downstream from the second fluid opening to receive the second fluid. The second fluid control element is configured to enlarge the second flow opening upon an increase in flow of the second fluid and to shrink the second flow opening upon a decrease in flow of the second fluid.

A further aspect concerns a thermostatic valve. The thermostatic valve includes a housing that defines a valve cavity, a first inlet port for receiving a first fluid at a first temperature and a second inlet port for receiving a second fluid at a second temperature that is different from the first temperature. A flow regulator is disposed in the valve cavity to regulate flow of a mixture of the first fluid and the second fluid. A mixture regulator is disposed between the first inlet port and the second inlet port for regulating temperature of the mixture of the first fluid and the second fluid. The mixture regulator and the flow regulator define a first flow opening for regulating flow of the first fluid through the first flow opening. The mixture regulator defines a second flow opening for regulating flow of the second fluid through the second flow opening.

Still yet another aspect concerns a flow control valve system The system includes means for sensing at least one property that is indicative of a relative ratio of a first fluid and a second fluid in a mixture. The system further includes means for regulating the relative ratio of the first liquid and the second liquid in the mixture based on the means for sensing the at least one property. Furthermore, the system includes means for sensing flow of the mixture and means for regulating the flow of the mixture based on the means for sensing the flow of the mixture.

Further forms, objects, features, aspects, benefits, advantages, and embodiments of the present invention shall become apparent from the detailed description and drawings provided herewith.

DESCRIPTION OF SELECTED EMBODIMENTS

Figure 1:
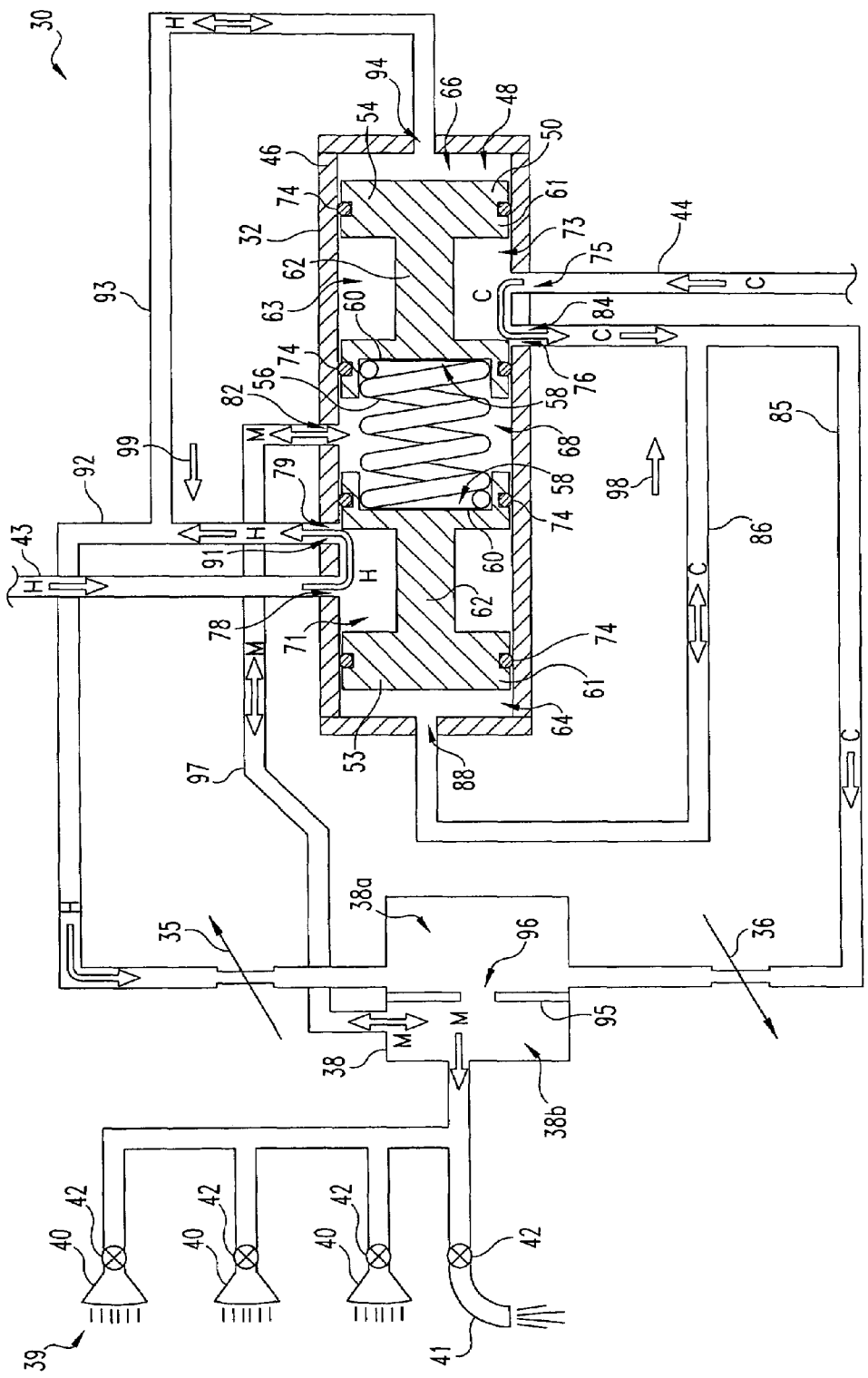
FIG. 1 is a cut-away diagram of a control valve system according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the illustrated device, and further applications of the principles of the invention as illustrated or described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

FIG. 1 illustrates a flow control system 30 according to one embodiment of the present invention. As illustrated, system 30 includes a flow control valve 32 that regulates the flow rate for both hot H and cold C water. As will be appreciated from the below description, the flow control valve 32 is configured to regulate the flow of two or more fluids at low as well as high flow conditions. Although the illustrated flow control valve 32 will be described with reference to a shower, it is contemplated that the flow control valve 32 can be used in other types of environments. It also should be appreciated that the flow control valve 32 can be used to control the flow other types of fluids, besides hot H and cold C water. System 30 includes a hot temperature control valve 35 that controls the flow of hot water H in the system 30 and a cold temperature control valve 36 that controls the flow of the cold water C in the system 30. The hot 35 and cold 36 control valves are used adjust the flow ratio of hot H and cold C water, which in turn adjusts the temperature of mixed water M. These two control valve act in inverse-proportion with each other, thereby maintaining consistent flow regardless of mix temperature setpoint. During a shower or bath, the person adjusts the hot 35 and cold 36 control valves to set the temperature of the mixed water M. It is contemplated that in other embodiments, valves 35 and 36 can be integrated together into a single unit or can be separate units. In the illustrated embodiment, although the valves 35 and 36 are illustrated as two separate components, the hot 35 and cold 36 water valves are linked together, such as in a single handle shower control, so as to be able to adjust hot and cold water pressure in a manner inversely proportional to one another so that the combined water flow from both valves 35, 36 remains generally the same. For example, as the hot water valve 35 is actuated to reduce the hot water flow, the cold water 36 valve increases the cold water flow, and vice-versa. Downstream from control valves 35 and 36, a mixer or mix chamber 38 mixes the hot H and cold C water together to form the mixed water M. The mixed water M is discharged from one or more outlets 39. In the illustrated embodiment, the outlets 39 include one or more showerheads 40 and at least one bathtub spout 41. It is envisioned that other embodiments can include more or less showerheads 40 and/or spouts 41 than illustrated in FIG. 1. Flow of the mixed water from the individual outlets is controlled with outlet valves 42. The outlet valves 42 can be manually adjusted by a person and/or automatically adjusted via a controller. It should be appreciated that other types of outlet valve arrangements can be used. For instance, one outlet valve 41 can be used to control two or more outlets 39.

Referring to FIG. 1, hot water H is supplied to the system 30 via a hot water supply tube 43, and the cold water C is supplied via a cold water supply tube 44. In the illustrated embodiment, the flow control valve 32 includes a housing 46 that defines an internal cavity 48 in which a flow control element assembly 50 is slidably received. The flow control element assembly 50 includes a hot water control element 53 and a cold water control element 54, which are elastically coupled together through a spring 56. In the illustrated embodiment, the control elements 53, 54 are in the form of spools, but it should be appreciated that the control elements 53, 54 can be shaped differently. The spring 56 in the illustrated embodiment is used to bias the spools 53, 54 apart so as to resist compression of the spools 53, 54 imparted by the hot H and cold C water. In the illustrated embodiment, the spring 56 includes a coil type compression spring. Nonetheless, it should be understood that other types of springs and/or elastic means can be used to couple the hot water spool 53 to the cold water spool 54. Each spool 53, 54 has a spring cavity 58 defined in an inner valve head 60 in which the spring 56 is secured. As should be appreciated, the spring 56 can be secured to the spools 53, 54 in a number of other manners, such as mechanically and/or with an adhesive. It is further contemplated that, since the spring 56 is normally under compression, the spring 56 does not necessarily need to be secured to the spools 53, 54. Each spool 53, 54 has an outer valve head 61 that is coupled to the inner valve head 60 via a shaft 62. In the illustrated embodiment, the spools 53, 54 are generally cylindrical in shape, but it is contemplated that the spools 53, 54 can have a different overall shape. Moreover, it is envisioned that other types of valve control mechanisms, besides spools 53, 54, can be used in the flow control valve 32. For example, the spools 53, 54 in another embodiment are replaced with diaphragm type valves.

The spool assembly 50 subdivides the internal cavity 48 into a number of sub-cavities 63. As shown, a cold water pressure sensing cavity 64 is defined between the outer valve head 61 of the hot water spool 53 and the housing 46. In FIG. 1, a hot water pressure sensing cavity 66 is defined between the housing 46 and the outer valve head 61 of the cold water spool 54. A mixed water sensing cavity 68 is defined between the inner valve heads 60 of the hot water 53 and cold water 54 control spools. Between the inner 60 and outer 61 valve head, the hot water spool 53 defines a hot water control cavity 71. In the cold water spool 54, a cold water control cavity 73 is defined between the inner valve head 60 and the outer valve head 61. To seal the sub-cavities 63 apart from one another, seals 74 are positioned between the valve heads 60, 61 and the housing 46. In another embodiment, the spool assembly 50 and housing 46 are sized such that a tight clearance space creates a seal between the valve heads 60, 61 and the housing 46 such that the seals 74 are not needed.

As depicted in FIG. 1, the housing 46 defines a cold water inlet port 75, which supplies cold water C from the cold water supply tube 44 to the cold water control cavity 73. The cold water C is discharged from the cold water control cavity 73 through a cold water outlet port 76 defined in the housing 46. In a similar arrangement, a hot water inlet port 78 in the housing 46 supplies hot water H from the hot water supply tube 43 to the hot water control cavity 71. The hot water H in the hot water control cavity 71 is discharged via a hot water outlet port 79, which is defined in the housing 46. The housing 46 further has a mixed water inlet port 82 through which mixed water M from the mixer 38 is received. For the sake of clarity, only individual ports have been illustrated in FIG. 1. However, it is contemplated that the housing 46 in other embodiment can include multiple ports of the same type.

The fluid flow of both the hot H and cold C water in system 30 will now be described with reference to FIG. 1. As illustrated, the cold water C is supplied via the cold water supply tube 44, and enters into the cold water control cavity 73 through the cold water inlet port 75. The flow of the cold water C that is discharged from the cold water outlet port 76 is controlled by a cold water control port 84, which is formed between the inner valve head 60 of the cold water spool 54 and the cold water outlet port 76. Depending on the position of the cold water spool 54, the size of the cold water control port 84 can vary, which in turn varies the flow of the cold water C discharged from the flow control valve 32. As the size of the cold water control port 84 becomes smaller, the flow of cold water C discharged from the flow control valve 32 is reduced. Conversely, when the size of the cold water control port 84 becomes larger, the flow of cold water C from the control valve 32 is increased. It should be appreciated that in other embodiments the positions of the cold water inlet 75 and outlet 76 ports can be swapped such that cold water control port 84 is formed at the cold water inlet 75 rather than at the cold water outlet 76. The cold water C is discharged from the flow control valve 32 via cold water outlet tube 85. From tube 85, the cold water C passes through valve 36 and into the mixer 38. In order to regulate the flow of the cold water C, a cold water pressure sensing passage 86 connects to the cold water outlet tube 85 so as to supply the pressure of the cold water C to the cold water sensing cavity 64. As shown, the cold water C is supplied to the cold water sensing cavity 64 via a cold water pressure differential port 88 that is defined in the housing 46.

With respect to the hot water H flow path, the hot water supply tube 43 supplies the hot water H to the hot water control cavity 71 via the hot water inlet port 78. As illustrated in FIG. 1, a hot water control port 91 is formed between the inner valve head 60 of the hot water spool 53 and the hot water outlet port 79. Depending on the position of the hot water control spool 53, the size of the hot water control port 91 can vary, thereby changing the flow of the hot water H discharged from the flow control valve 32. As the size of the hot water control port 91 becomes smaller, the flow of hot water H discharged from the flow control valve 32 is reduced. In contrast, when the size of the hot water control port 91 becomes larger, the flow of hot water H from the control valve 32 is increased. It is contemplated that in other embodiments the relative positions of the hot water inlet 78 and outlet 79 ports can be swapped such that hot water control port 91 is formed at the hot water inlet port 78, rather than at the hot water outlet port 79. Once the hot water H is discharged from the hot water outlet port 79, the hot water H travels through a hot water outlet tube 92. The hot water outlet tube 92 supplies the hot water H to the hot water control valve 35, which in turn supplies the hot water H to the mixer 38. A hot water pressure sensing passage 93 supplies the hot water H from the hot water outlet tube 92 to the hot water sensing cavity 66 via a hot water pressure differential port 94, which is defined in the housing 46.

As depicted in FIG. 1, a restrictor 95 with a restriction opening 96 subdivides the mixer 38 into upstream 38a and downstream 38b portions. The flow control valve 32 monitors changes in the pressure drop across the restrictor 95 so as to sense flow variations of the mixed water M. The restrictor opening 96 is sized small enough so as to create a pressure drop between the upstream 38a and downstream 39b portions of the mixer 38, but the restrictor opening 96 is not sized too small to significantly affect the flow of the mixed water M from the mixer 38. In the illustrated embodiment, the restrictor 95 is a restrictor plate. However, it is contemplated that other type of restriction structures and/or devices can be used, and the restrictor 95 can be positioned at other locations. For example, portions of the cold water outlet tube 85 and the hot water outlet tube 92 downstream from the cold water 86 and hot water 93 sensing cavities, respectively, can be smaller in size so as to form a restrictor 95 in each tube 85, 92. As another example, the pressure drop across the control ports (or edges) 76, 91 can be measured such that the control ports 76, 91 act as the restrictor 95. In the embodiment illustrated in FIG. 1, the size of the restrictor opening 96 is fixed, but as will be appreciated from the discussion below, the size of the restrictor opening 96 in other embodiments can be variable. As shown, the cold water 85 and hot water 92 outlet tubes are fluidly coupled to the upstream 38a portion of the mixer 38. A mixed water pressure sensing passage 97 fluidly couples the downstream portion 38b of the mixer 38 with the mixed water sensing cavity 68 via the mixed water inlet port 82. As noted below, the flow control valve 32 regulates the overall flow rate of the mixed water M discharged from the mixer 38 based on the pressure drop across the restrictor 95. In the illustrated embodiment, the passages, tubes as well as other components are illustrated as being separate from the flow control valve 32. Nevertheless, it is contemplated that some or all of the passages, tubes, and other components, such as the mixer 38, can be integrated into the flow control valve 32.

Naturally, under flow conditions the pressure (with respect to atmospheric), in the downstream portion 38b is less than the upstream portion 38a of the mixer 38. The spring 56 in the mixed water sensing cavity 68 is used to partially resist the compressive forces imparted by the pressure of the cold C and hot H water in the cold 64 and hot 66 sensing cavities so that the mixed water sensing cavity 68 does not completely collapse. Moreover, the spring 56 in conjunction with the mixed water M in the mixed water sensing cavity 68 transmits force between the spools 53, 54 so that the spools 53, 54 are able to move in unison to properly regulate the flow of the cold C and hot H water. It is contemplated that in other embodiments portions of the spools 53, 54 can be sized and shaped differently so that the pressure of the mixed water M in the mixed water sensing cavity 68 is solely responsible for preventing the collapse of the mixed water cavity 68, thereby eliminating the need for the spring 56.

As mentioned above, the flow control valve 32 is configured to provide generally consistent control of water flow from the outlets 39 under both high and low water flow conditions from the outlets 39. With the flow control valve 32, the flow from the outlets 39 is consistent whether one or all of the outlets 39 is supplying water. When high flow conditions exist, such as when all of the outlets 39 are open, the pressure in the downstream portion 38b of the mixer 38 drops relative to the upstream portion 38a, which in turn causes the pressure in the mixed water sensing cavity 68 to decrease relative to the cold 64 and hot 66 sensing cavities. As a result, the spools 53, 54 shrink the mixed water sensing cavity 68, thereby opening the cold water 84 and hot water 91 control ports further to increase the flow of both the cold water C and hot water H from the control valve 32. The mixed water sensing cavity 68 continues to shrink until an equilibrium state is reached. When low water flow conditions exist, such as when only one shower head 40 is operating or the outlet valves 42 are only partially open, the pressure in the downstream portion 38b of the mixer 38 increases relative to the upstream portion 38a, which in turn causes the pressure in the mixed water sensing cavity 68 to increase relative to the other sensing cavities 64, 66. The increasing pressure in the mixed water sensing cavity 68 causes the spool 53, 54 to spread apart so as to increase the size of the mixed water sensing cavity 68. As the mixed water sensing cavity 68 grows, the cold water 84 and hot water 91 control ports shrink, thereby reducing the flow of both the cold C and hot H water from the control valve 32. In turn, the reduced flow of the cold C and hot H water reduces the flow of the mixed water M. The mixed water sensing cavity 68 continues to grow until an equilibrium state is reached so that the water flow from the system is maintained at a generally constant level.

In addition to maintaining a generally constant flow rate at both high and low flow conditions (and flow conditions in between), the flow control valve 32 is also configured to generally maintain a steady ratio of hot H and cold C water, which in turn provides a consistent water temperature for the mixed water M discharged from the outlets 39 regardless of supply pressure variations. In typical showers, the temperature of the water sprayed from the shower varies based on the supply of hot H and cold C water. During operation of a typical shower, the flow of the hot H and cold C water can vary due to many factors. For example, the flush of a toilet can temporarily reduce the cold water flow to the shower, which in turn can monetarily make the shower very hot. Likewise, the running of a washing machine can reduce the flow hot water to a shower so that the shower becomes temporarily frigid. The flow control valve 32, according to the present invention, is able to maintain a consistent hot H and cold C water ratio, and as a result, the temperature of the mixed water M discharged from the outlets 39 generally remains constant. With reference to the previous example, even when the flow of hot water H into the flow control valve 32 is reduced due to a washing machine or some other cause, it is desirable the temperature of the mixed water M discharged from the showerheads 40 remain generally constant. When the incoming flow of hot water H is reduced and/or the supply of cold water C is increased, the pressure of the hot water H in the hot water sensing cavity 66 decreases relative to the pressure of the cold water C in the cold water sensing cavity 64. As this occurs, the spool assembly 50 slides in a first direction 98 (to the right in FIG. 1) towards the hot water sensing cavity 66. The spring 56 and the pressure of the mixed water M in the mixed water sensing cavity 68 allows the spools 53, 54 in the spool assembly 50 to move in unison. When the spool assembly 50 slides in the first direction 98 towards cavity 66, the size of the hot water control port 91 increases, thereby increasing the flow of the hot water H into the mixer 38. At the same time, the size of the cold water control port 84 decreases as the spool assembly 50 slides in the first direction 98, thereby decreasing the flow of the cold water C discharged into the mixer 38. The spool assembly 50 continues to slide in the first direction 98 until the hot H and cold C water flows equalise at the desired hot H and cold C water ratio.

When the flow of cold water C into the flow control valve 32 is reduced, the pressure of the cold water C in the cold water sensing cavity 64 is relatively lower than the pressure of the hot water H in the hot water sensing cavity 66. The higher relative pressure of the hot water H in the hot water sensing cavity pushes the spool assembly 50 in a second direction 99 (to the left in FIG. 1) towards the cold water sensing cavity 64. As the spool assembly 50 slides in the second direction 99, the effective size of the cold water control port 84 increases, thereby increasing the flow of the cold water C supplied by the control valve 32. At the same time, the hot water spool 53 of the spool assembly 50 constricts the hot water control port 91 such that the flow of the hot water H from the flow control valve 32 is reduced. The spool assembly 50 continues to slide in the second direction 99 until an equilibrium state is achieved between the hot H and cold C water. By adjusting the flow of both the hot H and cold C water, the flow control valve 32 is able to control the flow ratio between the hot H and cold C water so that a generally consistent mixed water temperature is maintained. In addition, as discussed above, the flow control valve 32 is also able to regulate the flow of the mixed water M from the shower head 40 under both high and low flow conditions. The flow control valve 32 illustrated in FIG. 1 compensates for changes in both the incoming and outgoing water flow rates so that both the temperature and flow rate of the mixed water M discharged from the outlets 39 is maintained at a generally consistent level.

Figure 2:
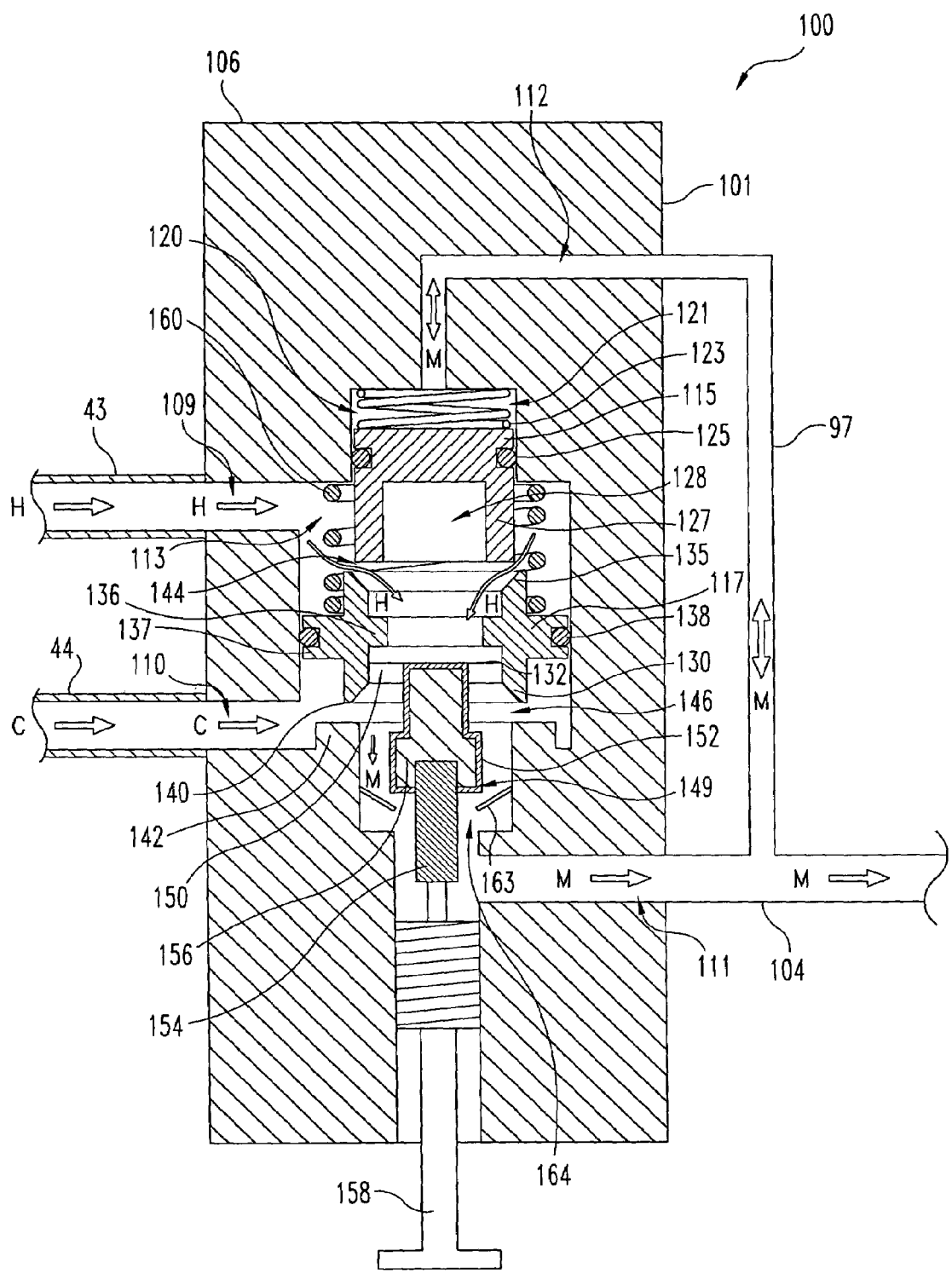
FIG. 2 is a cross-sectional view of a thermostatic valve according to another embodiment of the present invention.
Figure 3:
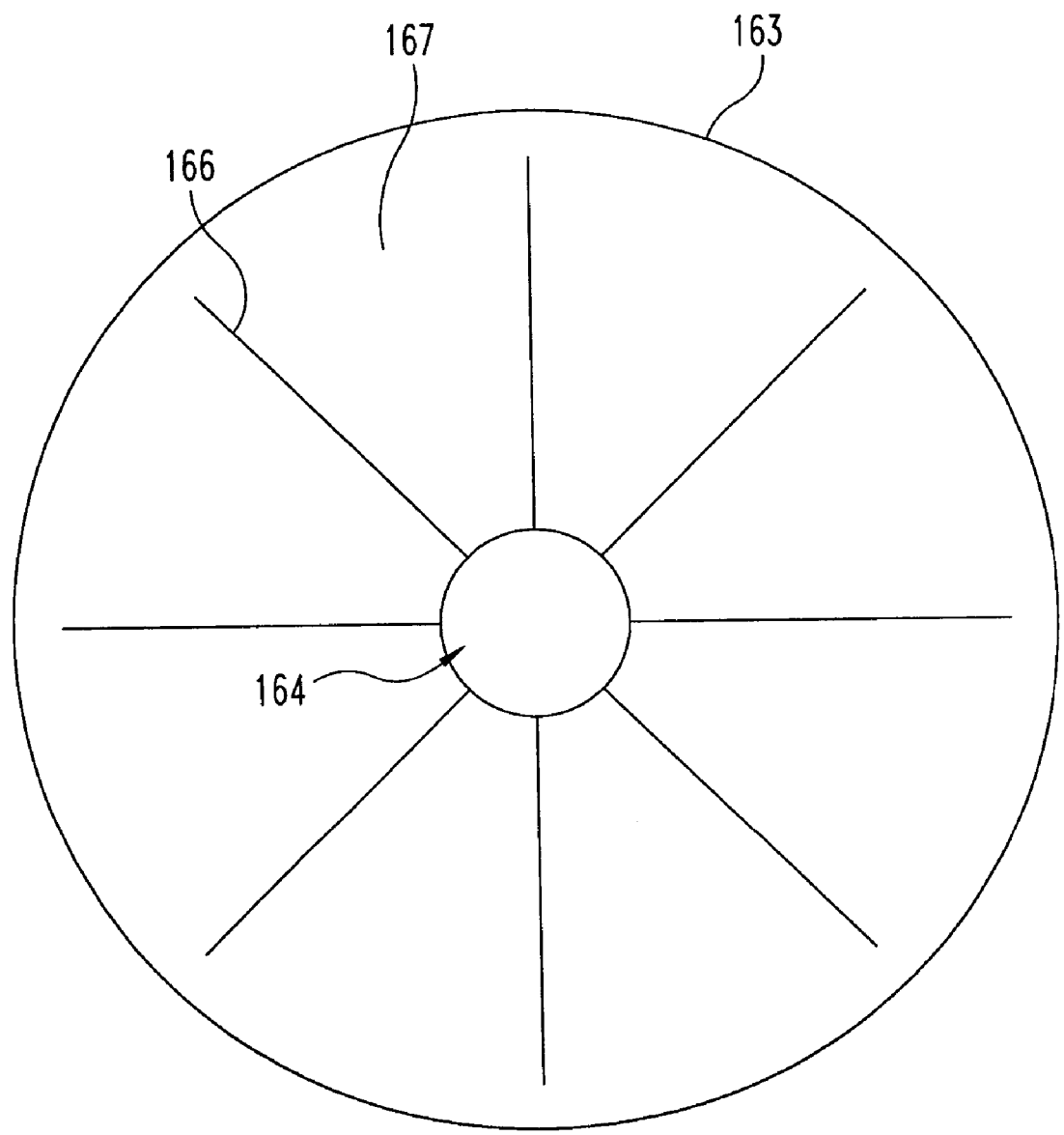
FIG. 3 is a top view of a variable aperture restrictor used in the FIG. 2 valve.

A thermostatic control valve system 100, according to another embodiment of the present invention, will now be described with reference to FIGS. 2 and 3. Referring to FIG. 2, the thermostatic control valve system 100 includes a thermostatic flow control valve 101 that regulates both the flow and temperature of mixed water M discharged from the thermostatic control valve 101. Like the previous embodiment, the thermostatic control valve 101 is able to regulate the flow from the valve 101 under both low and high flow conditions, as well as flow conditions in between, and the thermostatic control valve 101 is able to maintain the temperature of the mixed water M discharged from the valve 101. The thermostatic control valve 101 receives hot H and cold C water from hot 43 and cold 44 water supply tubes. The mixed hot and cold water M is discharged from valve 101 via a mixed water outlet tube 104. As shown, the valve 101 has a body or housing 106 that defines a hot water inlet port 109, a cold water inlet port 110, and a mixed water outlet port 111. The hot water H from the hot water supply tube 43 is supplied to the valve 101 via the hot water inlet port 109. In a similar fashion, the cold water C is supplied by the cold water supply tube 44 via the cold water inlet port 110. The mixed water outlet port 111 discharges the mixed water M from the valve 101 into the mixed water outlet tube 104. The mixed water outlet tube 104 is constructed to supply the mixed water to one or more outlets 39, such as the showerheads 40 shown in FIG. 1.

Between the inlet ports 109, 110 and the outlet port 111, the housing 106 further defines a valve cavity 113 in which a flow compensator 115 and a mixture regulator 117 are received. Inside the valve cavity 113, the housing 106 further defines a compensator cavity 120 in which the flow compensator 115 is slidably received. As depicted, a mixed water pressure differential inlet port 112, which is defined in the housing 106, is coupled to the mixed water pressure sensing passage 97. The mixed water pressure sensing passage 97 connects to the mixed water outlet tube 104. It is envisioned that, instead of being a separate component, the mixed water pressure sensing passage 97 can be formed integrally with the housing 106. A mixed water sensing cavity 121 is formed between the flow compensator 115 and the housing 106 in the compensator cavity 120. Within the sensing cavity 121, a pressure differential spring 123 resiliently biases the flow compensator 115 from the closed end of the sensing cavity 121 so as to prevent the collapse of the sensing cavity 121 against the pressure differential between the supplied and discharged water. Like the previous embodiment, it is envisioned that the valve can be configured to eliminate the need for the pressure differential spring 123. As shown, the mixed water pressure sensing port 112 fluidly communicates with the mixed water sensing cavity 121.

As illustrated in FIG. 2, the flow compensator 115 includes a seal 125 that seals the sensing cavity 121 from the remainder of the valve cavity 113. As should be appreciated, the sensing cavity 121 can be sealed in other manners. For example in other embodiments, the seal 125 on the flow compensator can be omitted such that the sensing cavity 121 is sealed by a tight fit between the flow compensator 115 and the walls of the compensator cavity 120. In the illustrated embodiment, the flow compensator 115 and the mixture regulator 117 are generally cylindrical in shape. However, it is contemplated that flow compensator 115 and the mixture regulator 117 can have other different general shapes in further embodiments. In FIG. 2, the flow compensator 115 has a mixture regulator engaging control member or edge 127 that is adapted to engage mixture regulator 117. As depicted, the flow compensator 115 further defines a mixture regulator cavity 128.

When the pressure of the mixed water M in the mixed water outlet tube 104 increases, the mixed water sensing cavity 121 expands, thereby pushing the flow compensator 115 towards the mixture regulator 117. As a result, the amount of hot water H that is mixed with the cold water C is reduced causing a slight decrease in the temperature of the mixed water M. As will be described in greater detail below, a thermostatic element (149) in the valve 101 contracts causing the port supplying hot water H to open and the port supplying cold water C to close, thereby re-establishing thermo-equilibrium of the mixed water M. This action increases pressure drop across the control edges in the control valve 101 such that regulation and control of the valve 101 is enhanced at low flow rates. In contrast, when the pressure of the mixed water M becomes lower relative to the incoming hot H and cold C water, the mixed water sensing cavity 121 shrinks so that the flow compensator 115 moves away from the mixture regulator 117. As the flow compensator 115 moves away from the mixture regulator 117, the flow of hot water H into the thermostatic valve 101 increases, resulting in an increase in the flow of the mixed water M from the thermostatic valve 101.

In the illustrated embodiment, the mixture regulator 117 has a mixture regulator body 130 that defines a hot water flow cavity 132 through which hot water H flows. A flow compensator engaging control edge 135 of the mixture regulator 117 faces the control edge 127 of the flow compensator 115. Together, control edges 127 and 135 control the flow of hot water H into the hot water flow cavity 132. Referring to FIG. 2, the control edge 135 of the mixture regulator 117 is bevelled towards the hot water flow cavity 132. Inside the flow cavity 132, a ridge 136 extends radially inwards. In one embodiment, ridge 136 can be used to support a spring that is received in the mixture regulator cavity 128 so as to bias the flow compensator 115 from the mixture regulator 117. In the illustrated embodiment, the spring for biasing the flow compensator 115 from the mixture regulator 117 is omitted. Extending in a radially outward direction from the body 130 of the mixture regulator 117, a housing engaging flange 137 slidably engages the housing 106. As depicted, the housing engaging flange 137 has a mixture regulator seal 138 that seals the hot water H from the cold water C in the valve cavity 113. It is contemplated that in other embodiments the flow control valve 101 can be sealed in other manners. For example, the mixture regulator seal 138 can be omitted such that the hot water H and cold water C are sealed from one another via a tight fit between the mixture regulator 117 and the housing 106. Opposite control edge 135, the mixture regulator 117 has a housing engaging control edge 140 that faces a mixture regulator control ridge 142, which extends inside the internal cavity 113 from the housing 106. Together, control edge 140 and control ridge 142 control the flow of cold water C into the valve 101. Between control edge 127 of the flow compensator 115 and control edge 135 of the mixture regulator 117, a hot water control opening or passage 144 is defined that controls the flow rate of the hot water H. Similarly, a cold water control opening or passage 146 is defined between the control ridge 142 in the housing 106 and the control edge 140 of the mixture regulator 117.

In order to control the temperature of the mixed water M, valve 101 includes a thermostatic element 149 that is attached to the mixture regulator 117 via connector arms 150. As shown, the arms 150 extend in a radially inward direction towards the thermostatic element 149. The arms 150 are spaced apart from one another so as to allow passage of hot water H through the hot water flow cavity 132. As shown, the thermostatic element 149 includes a cap portion 152 in which a stem portion 154 is received. The cap portion 152 is filled with a thermally expandable medium 156, such as a wax. The thermally expandable medium 156 expands upon being heated and it contracts upon being cooled. It should be appreciated that the control valve 101 can include other types of thermal elements besides the one illustrated. The stem portion 154 is coupled to a temperature adjustment knob 158 that is used to adjust the desired temperature of the mixed water M. As shown, the temperature adjustment knob 158 theadedly engages the housing 106. Upon turning the knob 158, the thermostatic element 149, along with the mixture regulator 117 can be repositioned inside the valve cavity 113. By turning the knob 158 such that the mixture regulator 117 moves towards the flow compensator 115, the size of the hot water control opening 144 is reduced, while the size of the cold water control opening 146 is enlarged so that the temperature of the mixed water M is reduced. Rotating the knob 158 in the opposite direction causes the mixture regulator 117 to move towards control ridge 142, thereby constricting the cold water C flow while at the same time increasing the hot water H flow. By increasing the hot water H flow and decreasing the cold water C flow, the temperature of the mixed water M is raised.

In a similar fashion, the thermostatic element 149 automatically controls the temperature of the mixed water M. As depicted, the thermostatic element 149 is positioned where the hot H and cold C water are mixed together to form mixed water M, and the thermostatic element 149 automatically adjusts the flow of hot H and cold C water so that the desired temperature for the mixed water is maintained. During operation, the flow of the hot H and cold C water supplied to the thermostatic flow control valve 101 can vary due to many factors. For example, if left unchecked, the flush of a toilet can temporarily reduce the flow of cold water C to the valve 101, which in turn can monetarily make the mixed water M very hot. When the temperature of the mixed water M is above the desired temperature, the medium 156 in the thermostatic element 149 expands such that the mixture regulator 117 moves towards the flow compensator 115 so as to constrict the flow of hot water H through the hot water control opening 144 and increase the flow of cold water C through the cold water control opening 146. By reducing the flow of hot water H and increasing the flow of cold water C, the relative temperature of the mixed water M is decreased until the desired temperature is achieved.

Interruptions or reductions to the flow of hot water H can make the mixed water M undesirably cold. For instance, the operation of a washing machine can reduce the flow of hot water H to the valve 101. When the mixed water temperature M is reduced, by a relative reduction in the supply of hot water H or a relative increase in the supply of cold water C, the medium 156 inside the thermostatic element 149 contracts. Since thermostatic elements 149 are typically less responsive when contracting upon cooling, the valve 101 further includes a return spring 160 that is positioned between the flange 137 on the mixture regulator 117 and the housing 106 to aid in the contraction of the thermostatic element 149. The return spring 160 is biased to push the mixture regulator 117 towards control ridge 142. It is contemplated that in other embodiments the return spring 160 can be omitted, depending of the operational properties of the thermostatic element 149 used. When the mixed water becomes cooler, the return spring 160 helps to push the mixture regulator 117 towards the mixture regulator control ridge 142 in the housing so as to reduce the size of the cold water control opening 146, thereby reducing the relative flow of the cold water C. At the same time, the size of the hot water control opening 144 increases such that the relative flow of hot water H is increased. By reducing the relative flow of cold water C and increasing the relative flow of hot water H, the overall temperature of the mixed water M is raised until it reaches the desired temperature.

In addition to regulating the water temperature, the thermostatic flow control valve 101 is able to regulate the flow of the mixed water M under both high and low water flow conditions. Like the previous embodiment, the thermostatic control valve 101 senses changes in the pressure across a restrictor 163 that is positioned downstream from the flow compensator 115, around the thermostatic element 149. In the illustrated embodiment, the restrictor 163 is a variable aperture type restrictor that creates a linear relationship between flow rate and pressure across the restrictor 163. By sensing a linear relationship between the pressure and the flow rate in the control valve 101, the flow rate of the mixed water M can be accurately controlled over a broader range of flow rates. As shown in FIGS. 2 and 3, the restrictor 163 defines a flow opening 164 through which the mixed water M flows. One or more slots 166 are formed in the aperture member 163 around the flow opening 164. The slots 166 define one or more flaps 167 around the flow opening 164. The flaps 167 are flexible so that the flow opening 164 is able to expand and contract. When a relatively small pressure of the mixed water M applied against the flaps 167, the flaps 167 remain generally undeflected. When the flaps 167 are in the undeflected state, the size of the flow opening 164 is relatively small. As the pressure increases, the flaps 167 are deflected to a greater degree by the mixed water M such that the effective size of the flow opening 164 is increased. By utilising a variable opening size in the restrictor 163, the flow of the mixed water M from the thermostatic control valve 101 can be accurately controlled over a broad range of flow rates.

The flow compensator 115 along with the mixture regulator 117 are used to regulate the flow of the mixed water M. For example, low water flow conditions can exist when only a single showerhead 40 is in use. As the flow of the mixed water M from the thermostatic flow control valve 101 reduces, the pressure of the mixed water M in the sensing cavity 121 increases relative to the inflowing hot H and cold C water such that the flow compensator 115 is pushed towards the mixture regulator 117. In turn, the size of the hot water control opening 144 is reduced, thereby reducing the flow of the hot water H that is mixed into the mixed water M. Due to the lower mixed water temperature created by the reduction of hot water H, the thermostatic element 149 constricts the cold water control opening 146. By constricting the hot water 144 and cold water 146 control openings, the overall flow rate of the mixed water M from the thermostatic control valve 101 is reduced such that the flow rate remains at a generally consistent level. In contrast, when the flow of the mixed water M from the thermostatic flow control valve 101 is increased, such as when multiple showerheads 40 are in use, the pressure drop across the restrictor 163 is greater so that the mixed water M downstream from the restrictor 163 has an even lower pressure than the mixed water M upstream from the restrictor 163. In response to the lower relative pressure of the mixed water M, the flow compensator 115 retracts from away from the mixture regulator 117 such that the size of the hot water control opening 144 increases. The resulting higher mixed water temperature causes the thermostatic element 149 to expand so as to likewise increase the size of the cold water control opening 146 so that the temperature of the mixed water M remains relatively constant. By increasing the size of the hot water 144 and cold water 146 control openings, the overall flow of the mixed water M is increased. It is contemplated that in another embodiment the valve 101 can include a second flow compensator 115 that is used to directly adjust the flow of cold water C through the cold water control opening 146 in order to control the flow of the mixed water M.

Figure 4:
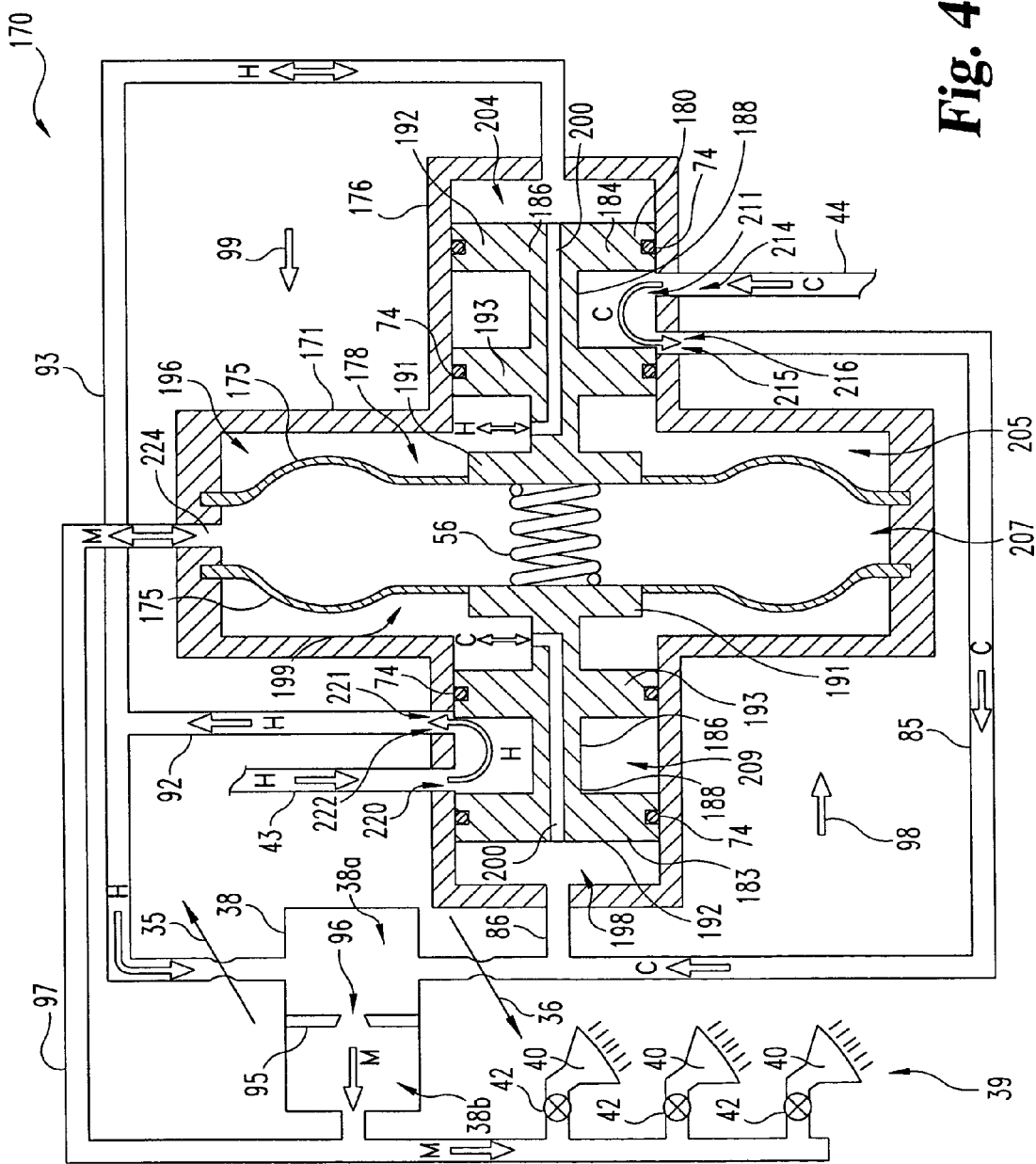
FIG. 4 is a cut-away diagram of a control valve system according to a further embodiment.

As mentioned above, it should be appreciated that the flow control valves according to the present invention can incorporate a variety of types of valves as well as different combinations of valve types. A flow control system 170 with a flow control valve 171 that incorporates diaphragm type valves 175 is illustrated in FIG. 4. The flow control valve 171 is configured to regulate both the temperature and flow rate of the mixed water M discharged from the outlets 39. The flow control system 170 shares a number of features in common with the previously described embodiments. For example, the flow control system 170 includes hot water supply tube 43 that supplies hot water H to the flow control valve 171 and cold water supply tube 44 that supplies cold water C to the flow control valve 171. Cold water C is discharged from the flow control valve 171 via the cold water outlet tube 85, and the hot water H is discharged via the hot water outlet tube 92. Hot 35 and cold 36 temperature control valves are disposed along the hot water outlet tube 92 and the cold water outlet tube 85, respectively. Although the valves 35 and 36 are depicted in FIG. 4 as two separate components, the hot 35 and cold 36 water valves are linked together, such as in a single handle shower control, so as to be able to adjust hot and cold water pressure in a manner inversely proportional to one another so that the combined water pressure from both valves 35, 36 remains generally the same. The outlet tubes 85, 92 are connected to the mixer 38 in which the hot H and cold C water is mixed to form mixed water M. Inside, the mixer 38 has the restrictor 95 with the restriction opening 96. The restrictor 95 subdivides the mixer 38 into upstream 38*a* and downstream 38*b* portions. In the illustrated embodiment, the restrictor 95 is a restrictor plate, and the restriction opening 96 is fixed. However, it should be appreciated that the restrictor 95 in FIG. 4 can include other types of restrictors, such as variable aperture type restrictors. The mixed water M is discharged from one or more outlets 39 that are fluidly coupled to the mixer 38. The outlets 39 illustrated in FIG. 4 are showerheads 40 with outlet valves 42, but it should be understood that other types of outlets 39 can be used.

With reference to FIG. 4, the flow control valve 171 includes a housing 176 that defines an internal cavity 178 in which a valve assembly 180 is disposed. The valve assembly 180 includes a first, hot water control element 183 and a second, cold water control element 184, which are coupled together through spring 56. The spring 56 depicted in FIG. 4 is a coil spring, but it should noted be that other types of resilient means can be used. Moreover, the flow control valve 171 can be configured to eliminate the need for the spring altogether. Each control element 183, 183 has a spool portion 186 to which the diaphragm valve 175 is secured. Both spools 186 have a shaft 188 with inner 191 and outer 192 heads attached to opposite ends of the shaft 188. Between the inner 191 and outer 192 heads, each spool 186 has an intermediate head 193. In the illustrated embodiment, the spools 186 are generally cylindrical in shape, but it is contemplated that the spools 186 can have a different overall shape. As shown, the diaphragm valves 175 are secured to the inner heads 191 of the spools 186. To accommodate the diaphragm valves 175, the internal cavity 178 has a diaphragm cavity 196 that is larger than the rest of the internal cavity 178. Nonetheless, it should be understood that the diaphragm cavity can be sized differently in other embodiments.

The valve assembly 180 subdivides the internal cavity 178 into a number of sub-cavities. As shown, an outer cold water sensing cavity 198 is defined between the outer valve head 192 of the hot water control element 183 and the housing 176. An inner cold water sensing cavity 199 is defined between the intermediate head 193 and the diaphragm valve 175 of the hot water control element 183. The inner 199 and the outer 198 cold water sensing cavities are connected to one another through a passageway 200 that is defined in the spool 186 of the hot water control element 183. In FIG. 4, an outer hot water sensing cavity 204 is defined between the outer valve head 192 of the cold water control element 184 and the housing 176. An inner hot water sensing cavity 205 is defined between the intermediate head 193 and the diaphragm valve 175 of the cold water control element 184. The inner 205 and the outer 204 hot water sensing cavities are connected to one another through the passageway 200 in the spool 186 of the cold water control element 184. A mixed water sensing cavity 207 is defined between the diaphragm valves 175 of both control elements 183, 184. Between the outer 192 and intermediate 193 valve heads, the hot water control element 183 defines a hot water control cavity 209. In the cold water control element 184, a cold water control cavity 211 is defined between the intermediate valve head 193 and the outer valve head 192. To seal the sub-cavities apart from one another, seals 74 are positioned between the outer 192 as well as intermediate 193 valve heads and the housing 46. It is contemplated that in other embodiments the seals are eliminated.

As shown in FIG. 4, the housing 176 defines a cold water inlet port 214, which supplies cold water C from the cold water supply tube 44 to the cold water control cavity 211. The cold water C is discharged from the cold water control cavity 211 through a cold water outlet port 215 defined in the housing 176. The flow of the cold water C that is discharged from the cold water outlet port 215 is controlled by a cold water control port 216, which is formed between the intermediate valve head 193 of the cold water control element 184 and the cold water outlet port 215. In a similar arrangement, a hot water inlet port 220 in the housing 176 supplies hot water H from the hot water supply tube 43 to the hot water control cavity 209. The hot water H in the hot water control cavity 209 is discharged via a hot water outlet port 221, which is defined in the housing 176. The flow of the hot water H that is discharged from the hot water outlet port 221 is controlled by a hot water control port 222, which is formed between the intermediate valve head 193 of the hot water control element 183 and the cold water outlet port 221. The housing 176 further has a mixed water inlet port 224 through which mixed water M from the mixer 38 is received into the mixed water sensing cavity 207. For the sake of clarity, only individual (single) ports have been illustrated in FIG. 4. However, it is contemplated that the housing 46 in other embodiment can include multiple ports of the same type. Moreover, it should be understood that the ports and the control elements can be arranged in a different manner. For instance, it is envisioned that the control elements 183, 184 can be arranged so that the control ports 216, 222 can be formed at the inlet ports 214, 220 instead of at the outlet ports 215, 221 by swapping the positions of the inlet tubes 43, 44 and the outlet tubes 92, 85.

A mentioned above, the flow control valve 171 in the illustrated embodiment is able to regulate both the discharge flow rate and the temperature of the mixed water M. When high flow conditions occur, such as when all of the showerheads 40 are in use, the flow control valve 171 is able to increase the flow of mixed water M to the showerheads 40 so that a steady flow rate is maintained. During high flow conditions, the pressure differential between the upstream portion 38*a* and the downstream portion 38*b* of the mixer 38 becomes larger, which results in the mixed water sensing cavity 207 having an even lower relative pressure as compared to the combined pressure of the hot H and cold C water. Due to the lower pressure, the mixed water sensing cavity 207 shrinks such that the water control elements 183, 184 move towards one another. In turn, both the cold 216 and hot 222 water control ports become larger, thereby increasing the combined flow of both the hot H and cold C water to the mixer 38. This increased flow to the mixer 38 increases the flow of mixed water M to the showerheads 40 so as to compensate for the high flow conditions.

When low flow conditions do occur, such as when only one showerhead 40 is on, the flow control valve 171 is able to compensate by reducing the combined flow of mixed water M to the single showerhead 171. During low flow conditions, the mixed water sensing cavity 207 grows in response to the increase in the relative pressure of the mixed water M downstream from the restrictor 95. As the mixed water sensing cavity 207 grows, the control elements 183, 184 constrict the control ports 216, 222 such that the flow of hot H and cold C water into the mixer 38 is reduced, and thus, the overall flow of mixed water M from the showerhead 40 is maintained at an acceptable level.

The flow control valve 171 indirectly regulates the water temperature by regulating the proportion at which the hot H and cold C water are mixed together. As previously noted, the operation of a washing machine or a dishwasher, for example, can reduce the flow of hot water in a household, and if left unchecked, can make the water in a typical shower frigidly cold. When the supply of hot water H into the system 170 is decreased and/or the supply of cold water C is increased into the system 170, the valve assembly 180 slides in the first direction 98 (to the right in FIG. 4) such that the size of the cold water control port 216 is shrunk to reduce the flow of cold water C and the size of hot water control port 222 is increased to boost the flow of hot water H. A discussed above, the flushing of a toilet or watering a yard, for instance, can reduce the supply of cold water in a household so that, if not remedied, the water in a typical shower or bathtub can become scalding hot. When the flow of cold water C is reduced and/or the flow of hot water H is increased into the system 170, the valve assembly 180 slides in the second direction 99 (to the left in FIG. 4) such that the size of the cold water control port 216 grows to increase the flow of cold water C and the size of hot water control port 222 shrinks to reduce the flow of hot water H. As a result, the temperature of the mixed water M can be reduced to the desired temperature.

Figure 5:
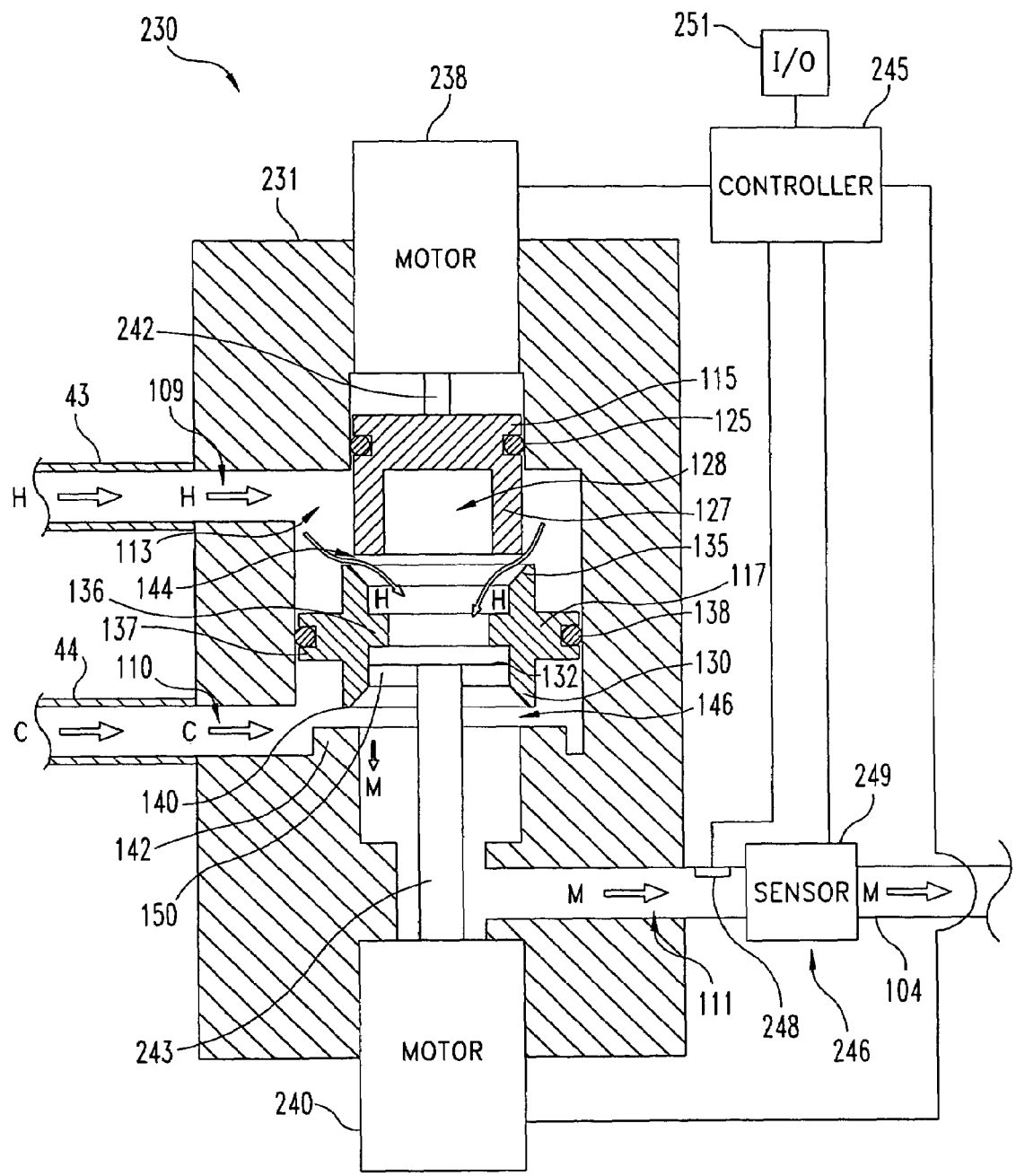
FIG. 5 is a diagrammatic view of a control valve system according to another embodiment.

A flow control valve system 230 according to another embodiment is illustrated in FIG. 5. As shown, the flow control valve system 230 in FIG. 5 shares a number of features in common with the system 100 illustrated in FIG. 2. For the sake of clarity and brevity, these common features will not be again described in detail below, but rather, reference is made to the description of these features made above for FIG. 2. Like the previous embodiments, the flow control valve system 230 of FIG. 5 is configured to provide generally consistent control of water flow from the outlets 39 under both high and low flow conditions. Furthermore, the flow control valve system 230 is operable to maintain a generally consistent water temperature for mixed water M discharged from the outlets 39, regardless of supply pressure variations.

With reference to FIG. 5, the flow control valve system 230 includes a flow control valve 231 that regulates both the flow and temperature of the mixed water M discharged from the valve 231. As depicted, the valve 231 has a valve body or housing 235 that defines hot water inlet 109, cold water inlet 110 and mixed water outlet 111 ports. Hot H and cold C water are respectively supplied to hot 109 and cold 110 inlet ports via hot 43 and cold 44 supply tubes, and mixed water M is discharge from the mixed water outlet port 111 via mixed water outlet tube 104. The housing 231 further defines valve cavity 113 in which flow compensator 115 and mixture regulator 117 are received. In the illustrated embodiment, a flow compensator motor 238 adjusts the position of the flow compensator 115 inside the valve cavity 113, and a mixture regulator motor 240 adjusts the position of the mixture regulator 117. As shown in FIG. 5, the flow compensator motor 238 has an actuation arm 242 coupled to the flow compensator 115 that is able to extend and retract the flow compensator 115. Likewise, the mixture regulator motor 240 has an actuation arm 243 coupled via connection arms 150 to the mixture regulator 117 so as to extend and retract the mixture regulator 117. In one embodiment, the motors 238, 240 are electrical motors, but it should be appreciated that the motors 238, 240 can include other types of motors or drive means, such as pneumatic and/or hydraulic type actuators. For instance, the motors 238, 240 in another embodiment are pneumatic pistons. Although in the illustrated embodiment two motors 238, 240 are shown, it should be appreciated that the valve 231 can include more or less motors than is shown. For instance, it is envisioned that in other embodiments the valve 231 can include only a single motor. As an example, a thermostatic element 149 of the type illustrated in FIG. 2 can be used in place of the mixture regulator motor 240. In another example, the compensator cavity 120 of FIG. 2 can substitute for the flow compensator motor 238.

As illustrated in FIG. 5, the flow control valve system 230 includes at least one controller 245 that is operatively coupled to the motors 238, 240, and the controller 245 is configured to control the operation of the motors 238, 240. The controller 245 and motors 238, 240 as well as other components can be powered by an external power source and/or by an internal power source, such as a battery. One or more sensors 246 for sensing properties of the water are operatively coupled to the controller 245. In the illustrated embodiment, the sensors 246 includes a temperature sensor 248 for sensing the temperature of the mixed water M and a flow sensor 249 for measuring the flow rate of the mixed water M discharged from the valve 231. In one embodiment, the temperature sensor 248 includes a thermocouple, but it should be appreciated that the temperature sensor 248 can include other types of devices for sensing temperature. Although sensor 248 measures water temperature in the illustrated embodiment, it is envisioned that sensor 248 can be configured measure other properties of fluids, such as acidity. Also, it is contemplated that in a modified version of the FIG. 1 system 30 two temperature sensors 248 can be used to measure the individual temperatures of the hot H and cold C water before the hot H and cold C water is mixed. The flow sensor 249 in one embodiment measures flow of the mixed water M indirectly by sensing a pressure drop across a restrictor, such as a variable or fixed opening restrictor plate of the type described above. In one form, the flow sensor 249 incorporates the restrictor, and in another form, the restrictor is external to the flow sensor 249. The flow sensor 249 can include additional sensors that measure the hot and cold water pressure upstream from the valve 231 so as to determine the pressure drop across the valve 231. In another embodiment, the flow sensor 249 directly measures the flow rate of the mixed water M, such as with a paddle wheel and/or turbine, thereby eliminating the need for a restrictor. Nevertheless, if so desired, a restrictor can still be used even when the flow sensor 249 measures flow directly. As should be appreciated, the flow of the mixed water M can be measured in other manners. In the illustrated embodiment, the sensors 246 are positioned along the mixed water outlet tube 104, but it is contemplated that the sensors 246 can be positioned at other locations, such as inside the valve 231.

Referring to FIG. 5, the flow control valve system 230 further includes at least one input/output (I/O) device 251 that allows a user to interface with the system 230. The I/O device 251 can allow the user to select the desired flow rate and temperature of the mixed water M. In one embodiment, the I/O device 251 includes a touch sensitive display, and in another embodiment, the I/O device 251 incorporates a separate keypad and display. As should be understood, the I/O device 251 can includes other types of input devices and output devices. Furthermore, it is contemplated that the flow control system 230 can just have an input device or an output device. The above-mentioned components, such as the motors, sensors and I/O device, can be operatively coupled to the controller 245 in a number of ways. By way of nonlimiting examples, these components can be operatively coupled to the controller 245 via electrically conductive wire, fiber optic cable, a radio or other wireless connection, a mechanical connection, a pneumatic line and/or a hydraulic connection, to name a few. Moreover, it envisioned that some or all of these components can be integrated together to form a single unit and/or integrated into the valve 231.

During operation, the flow of the hot H and cold C water supplied to the flow control valve 231 can vary due to many factors. For example, if left unchecked, the flush of a toilet can temporarily reduce the flow of cold water C to the valve 231, which in turn can monetarily make the mixed water M very hot. When the temperature sensor 248 senses that the temperature of the mixed water M is above the desired temperature, the controller 245 in one embodiment actuates the mixture regulator motor 240 such that the mixture regulator 117 moves towards the flow compensator 115 so as to constrict the flow of hot water H through the hot water control opening 144 and increase the flow of cold water C through the cold water control opening 146. In another embodiment, both motors 237, 240 are activated so as to constrict the flow of hot water H through the hot water control opening 144 and increase the flow of cold water C through the cold water control opening 146. By reducing the flow of hot water H and increasing the flow of cold water C, the relative temperature of the mixed water M is decreased until the desired temperature is achieved.

Interruptions or reductions to the flow of hot water H can make the mixed water M undesirably cold. When the mixed water temperature M is reduced, by a relative reduction in the supply of hot water H or a relative increase in the supply of cold water C, the controller 245 senses the colder temperature via the temperature sensor 248 and takes appropriate action to correct the temperature. In one embodiment, the controller 245 actuates the mixture regulator motor 240 such that the mixture regulator 117 moves away the flow compensator 115 so as to increase the flow of hot water H through the hot water control opening 144 and constrict the flow of cold water C through the cold water control opening 146. In another embodiment, both motors 237, 240 are activated so as to increase the size of the hot water control opening 144 and decrease the size of the cold water control opening 146, thereby reducing the relative flow of cold water C and increasing the relative flow of hot water H. By reducing the relative flow of cold water C and increasing the relative flow of hot water H, the overall temperature of the mixed water M is raised until it reaches the desired temperature. As should be appreciated, the motors 238, 240 can be activated in other manners, at other speeds and/or in other sequences to control the water temperature.

In addition to regulating the water temperature, the flow control valve 231 in FIG. 5 is able to regulate the flow of the mixed water M under both high and low water flow conditions. For example, low water flow conditions can exist when only a single showerhead 40 is in use. When the flow sensor 249 senses that the flow of the mixed water M from the flow control valve 231 has been reduced, the controller 245 actuates the flow compensator motor 238 such that the flow compensator 115 is pushed towards the mixture regulator 117. At the same time, the mixture regulator motor 240 moves the mixture regulator 117 so as to constrict the cold water control opening 146. As a result, the sizes of both the hot water control opening 144 and the cold water control opening 146 are reduced, thereby reducing the overall flow of the hot H and cold C water, which in turn reduces the flow of the mixed water M from the valve 231. In one form, the flow compensator 115 and the mixture regulator 117 are moved in a manner such that the flow openings 144, 146 are shrunk in the generally same relative manner such that the water temperature by and large remains constant. In one particular form, the flow compensator motor 238 moves the flow compensator 115 at about twice the rate as compared to the mixture regulator 117 so as to maintain generally the same opening size ratio between the flow openings 144, 146. By constricting the hot water 144 and cold water 146 control openings, the overall flow rate of the mixed water M from the control valve 231 is reduced such that the flow rate of the mixed water M remains at a generally consistent level.

In contrast, when the flow of the mixed water M from the flow control valve 231 is increased, such as when multiple showerheads 40 are in use, the flow sensor 249 senses this increase, and the controller 245 actuates the flow compensator motor 238 such that the flow compensator 115 is moved away from the mixture regulator 117 so that the hot water control opening 144 increases in size. At the same time, the mixture regulator motor 240 moves the mixture regulator 117 away from control ridge 142 so as to increase the size of the cold water control opening 146. Consequently, the sizes of both the hot water control opening 144 and the cold water control opening 146 are increased, thereby increasing the overall flow of the hot H and cold C water, which in turn increases the flow of the mixed water M from the valve 231. In one form, the flow compensator 115 and the mixture regulator 117 are moved in a manner such that the flow openings 144, 146 are increased in the generally same relative manner such that the water temperature by and large remains constant. In one particular form, the flow compensator motor 238 moves the flow compensator 115 at about twice the rate as compared to the mixture regulator 117 so as to maintain generally the same opening size ratio between the flow openings 144, 146, thereby maintaining thermo-equilibrium of the mixed water M. By enlarging the hot water 144 and cold water 146 control openings, the overall flow rate of the mixed water M from the control valve 231 is increased such that the flow rate remains at a generally consistent level. As should be appreciated, the motors 238, 240 can be activated in other manners, at other speeds and/or in other sequences to control the flow rate.

In the illustrated embodiment, the controller 245 (via the motors 238, 240) controls the flow and temperature of the mixed water M at the same time. Nevertheless, as should be appreciated, the motors 238, 240 can be activated in other manners and in other sequences to control both the flow rate and temperature. Moreover, it is contemplated that motorized control valves can be incorporated into the other embodiments described herein.

By regulating the flow in the manner as in the above-described systems, the flow rate and temperature of the mixed water from the showerheads 40, as well as other types of outlets 39, can be regulated at the same time. It should be appreciated that temperature and flow regulation can occur simultaneously in the above-described systems. Needless to say, the above-described systems can be used in other types of operational environments. For example, where temperature is not a concern, but the ratio at which fluids are mixed is a concern, it is envisioned that the above-described systems can still be utilised. Moreover, it is envisioned that other types of fluids, besides water, can be regulated with the systems according to the present invention. Also, it is contemplated that the above-described systems can be modified to regulate the flow of more than two fluids.

While the invention has been illustrated and described in detail in the drawings and foregoing description, the same is to be considered as illustrative and not restrictive in character, it being understood that only the preferred embodiment has been shown and described and that all changes, modifications, and equivalents that come within the spirit of the inventions described herein and/or defined by the following claims are desired to be protected.

What is claimed is:

1. A flow control valve system, comprising:
a flow sensor configured to sense flow of a mixed fluid that includes at least a first fluid and a second fluid; and
a valve including
a flow regulator operatively coupled to the flow sensor to regulate the flow of the mixed fluid based on the flow of the mixed fluid sensed by the flow sensor, the flow regulator defining at least in part a first flow opening through which the first fluid flows, the flow regulator being configured to shrink the first flow opening to reduce flow of the first fluid upon a decrease in the flow of the mixed fluid at the flow sensor and to enlarge the first flow opening to increase flow of the first fluid upon an increase in the flow of the mixed fluid at the flow sensor, and
a mixture regulator defining at least in part the first flow opening, the mixture regulator being configured to regulate a mixture ratio of the first fluid and the second fluid in the mixed fluid by at least adjusting size of the first flow opening.

2. The system of claim 1, wherein the flow sensor is configured to directly measure the flow of the mixed fluid.

3. The system of claim 2, wherein the flow sensor includes a turbine.

4. The system of claim 1, wherein the flow sensor is configured to indirectly measure the flow of the mixed fluid.

5. The system of claim 4, wherein the flow sensor includes a pressure sensor.

6. The system of claim 5, further comprising:
a restrictor having a restrictor opening through which the mixed fluid flows, the restrictor opening being sized to create a pressure drop in the mixed fluid across the restrictor; and
wherein the pressure sensor is configured to sense the pressure drop across the restrictor to measure the flow of the mixed fluid.

7. The system of claim 6, further comprising:
a mixer in which the first fluid and the second fluid are mixed; and
wherein the restrictor is disposed inside the mixer.

8. The system of claim 6, wherein the restrictor opening has a fixed size.

9. The system of claim 6, wherein the restrictor opening has a size that varies based on pressure of the mixed fluid.

10. The system of claim 1, further comprising a mixer in which the first fluid and the second fluid are mixed.

11. The system of claim 10, where the mixer and the valve are separate components fluidly coupled together.

12. The system of claim 10, wherein the mixer is integrated into the valve.

13. The system of claim 10, further comprising a restrictor disposed inside the mixer, the restrictor having a restrictor opening sized to create a pressure drop in the mixed fluid across the restrictor.

14. The system of claim 1, wherein the flow regulator and the mixture regulator are integrated into a flow control element assembly that includes a first fluid control element for controlling the flow of the first fluid and a second fluid control element for controlling flow of the second fluid.

15. The system of claim 14, further comprising a restrictor disposed downstream from the flow control element assembly, the restrictor having a restrictor opening sized to create a pressure drop.

16. The system of claim 14, wherein the first fluid control element includes a diaphragm valve.

17. The system of claim 14, wherein the first fluid control element includes a spool.

18. The system of claim 1, wherein the mixture regulator includes a thermostatic element.

19. The system of claim 1, further comprising a restrictor having a restrictor opening through which the mixed fluid flows, the restrictor having one or more slots that define one or more flaps around the restrictor opening.

20. The system of claim 1, further comprising one or more showerheads fluidly coupled to the valve.

21. The system of claim 1, wherein the first fluid includes hot water and the second fluid includes cold water.

22. The system of claim 1, further comprising a mixed fluid property sensor disposed downstream from the mixture regulator to sense at least one property of the mixed fluid, wherein the mixture regulator is configured to regulate the mixture ratio of the first fluid and the second fluid in the mixed fluid based on the property of the mixed fluid.

23. The system of claim 22, wherein the mixed fluid property sensor includes a temperature sensor to sense temperature of the mixed fluid.

24. The system of claim 1, further comprising a flow regulator motor coupled to flow regulator for moving the flow regulator.

25. The system of claim 1, further comprising a mixture regulator motor coupled to the mixture regulator for moving the mixture regulator.

26. The system of claim 25, further comprising:
a flow regulator motor coupled to the flow regulator;
a controller operatively coupled to the flow regulator motor, the mixture regulator motor and the flow sensor;
an input/output device operatively coupled to the controller for interfacing with a user; and
a mixed fluid property sensor operatively coupled to the controller for sensing at least one property of the mixed fluid.

27. A flow control valve system, comprising:
a flow sensor configured to sense flow of a mixed fluid that includes at least a first fluid and a second fluid; and
a valve including
a flow regulator operatively coupled to the flow sensor to regulate the flow of the mixed fluid based on the flow of the mixed fluid sensed by the flow sensor,
the flow regulator defining at least in part a first flow opening through which the first fluid flows, the flow regulator being configured to shrink the first flow opening to reduce flow of the first fluid upon a decrease in the flow of the mixed fluid at the flow sensor and to enlarge the first flow opening to increase flow of the first fluid upon an increase in the flow of the mixed fluid at the flow sensor, a mixture regulator defining at least in part the first flow opening, the mixture regulator being configured to regulate a mixture ratio of the first fluid and the second fluid in the mixed fluid by at least adjusting size of the first flow opening;

wherein the flow regulator and the mixture regulator are integrated into a flow control element assembly that includes a first fluid control element for controlling the flow of the first fluid and a second fluid control element for controlling flow of the second fluid;

a restrictor disposed downstream from the flow control element assembly, the restrictor having a restrictor opening sized to create a pressure drop;

wherein the valve has a valve body that defines a valve cavity in which the flow control element assembly is disposed;

wherein a mixed fluid cavity is defined between the first fluid control element and the second fluid control element;

wherein the valve body defines a first fluid discharge opening, the first flow opening being defined between the first fluid control element and the first fluid discharge opening;

wherein the valve body defines a second fluid discharge opening, a second flow opening being defined between the second fluid control element and the second discharge opening;

wherein the valve body and the first fluid control element define a first fluid cavity;

wherein the first fluid cavity is fluidly coupled upstream of the restrictor to receive the first fluid;

wherein the valve body and the second fluid control element define a second fluid cavity;

wherein the second fluid cavity is fluidly coupled upstream from the restrictor to receive the second fluid;

wherein the first fluid control element is configured to shrink the first flow opening upon an increase in pressure of the first fluid in the first fluid cavity and to expand the first flow opening upon a decrease in pressure of the first fluid in the first fluid cavity;

wherein the second fluid control element is configured to shrink the second flow opening upon an increase in pressure of the second fluid in the second fluid cavity and to expand the second flow opening upon a decrease in pressure of the second fluid in the second fluid cavity; and wherein the second fluid control element being configured to shrink the second flow opening to reduce flow of the second fluid upon an increase in pressure of the mixed fluid downstream from the restrictor and to enlarge the second flow opening to increase flow of the mixed fluid upon a decrease in the pressure of the mixed fluid downstream from the restrictor.

28. A flow control valve system, comprising:

a flow sensor configured to sense flow of a mixed fluid that includes at least a first fluid and a second fluid; and a valve including
   a flow regulator operatively coupled to the flow sensor to regulate the flow of the mixed fluid based on the flow of the mixed fluid sensed by the flow sensor,
   the flow regulator defining at least in part a first flow opening through which the first fluid flows, the flow regulator being configured to shrink the first flow opening to reduce flow of the first fluid upon a decrease in the flow of the mixed fluid at the flow sensor and to enlarge the first flow opening to increase flow of the first fluid upon an increase in the flow of the mixed fluid at the flow sensor,
   a mixture regulator defining at least in part the first flow opening, the mixture regulator being configured to regulate a mixture ratio of the first fluid and the second fluid in the mixed fluid by at least adjusting size of the first flow opening;

wherein the flow regulator and the mixture regulator are integrated into a flow control element assembly that includes a first fluid control element for controlling the flow of the first fluid and a second fluid control element for controlling flow of the second fluid; and wherein the flow control element assembly includes a spring disposed between the first fluid control element to the second fluid control element.

29. A flow control valve system for controlling a ratio of a first fluid and a second fluid in a mixed fluid and flow rate of the mixed fluid under varying flow conditions, the system comprising:

an outlet valve configured to at least adjust the flow rate of the mixed fluid;

means for measuring the flow rate of the mixed fluid;

a flow control valve located upstream from the outlet valve, the flow control valve including
   a first fluid control port having a first opening size for supplying the first fluid,
   a second fluid control port having a second opening size for supplying the second fluid, together the first opening size and the second opening size defining an effective opening size for the flow control valve that limits flow of the mixed fluid,
   means for changing the first opening size of the first fluid control port and the second opening size of the second fluid control port in a general inverse manner to control the ratio of the first fluid and the second fluid, and
   means for changing the effective opening size of the flow control valve based on the flow rate of the mixed fluid so that the outlet valve is able to reliably adjust the flow rate of the mixed fluid.

30. The system of claim 29, in which the means for measuring the flow rate of the mixed fluid includes a restrictor plate.

31. The system of claim 29, in which the means for changing the first opening size of the first fluid control port and the second opening size of the second fluid control port in a general inverse manner includes:

a first spool disposed in a slidable manner relative to the first fluid control port;

a second spool disposed in a slidable manner relative to the second fluid control port; and a spring disposed between the first spool and the second spool.

32. The system of claim 29, in which the means for changing the effective opening size of the flow control valve based on the flow rate of the mixed fluid so that the outlet valve is able to reliably adjust the flow rate of the mixed fluid includes:

a first spool disposed in a slidable manner relative to the first fluid control port; and a second spool disposed in a slidable manner relative to the second fluid control port.

33. The system of claim 29, in which:

the means for changing the first opening size of the first fluid control port and the second opening size of the second fluid control port in a general inverse manner includes a mixture regulator member that at least in part defines the first fluid control port and the second fluid control port; and the means for changing the effective opening size of the flow control valve based on the flow rate of the mixed fluid so that the outlet valve is able to reliably adjust the flow rate of the mixed fluid includes a flow regulator member that defines at least in part the first fluid control port and the second fluid control port.

34. A control valve system, comprising a flow sensor configured to measure flow rate of a mixed fluid that includes at least a first fluid and a second fluid; and a control valve assembly including a valve housing defining a first control port through which the first fluid flows and a second control port through which the second fluid flows, a first spool slidably disposed in the valve housing to adjust size of the first control port, a second spool slidably disposed in the valve housing to adjust size of the second control, the first spool and the second spool being configured to change the size of the first control port and the size of the second control port in an inverse fashion, and the first spool and the second spool being configured to change the size of the first control port and the second control port in a same fashion based on the flow rate measured at the flow sensor.

35. The system of claim 34, in which the valve housing, the first spool, and the second spool define a mixed fluid sensing cavity between the first spool and the second spool that expands and retracts based on the flow rate measured at the flow sensor.

36. The system of claim 35, further comprising:

a spring disposed between the first spool and the second spool in the mixed fluid sensing cavity.

37. The system of claim 35, in which the first spool and the second spool each include a diaphragm that defines the mixed fluid sensing cavity.

38. The system of claim 34, further comprising:

an outlet valve for adjusting the flow of the mixed fluid in which the control valve assembly allows the outlet valve to adjust the flow of the mixed fluid over a wide range of flow conditions.

* * * * *